July 15, 1924.
C. E. ECKRODE ET AL
1,501,844
SHOCK ABSORBER
Filed Nov. 29, 1922
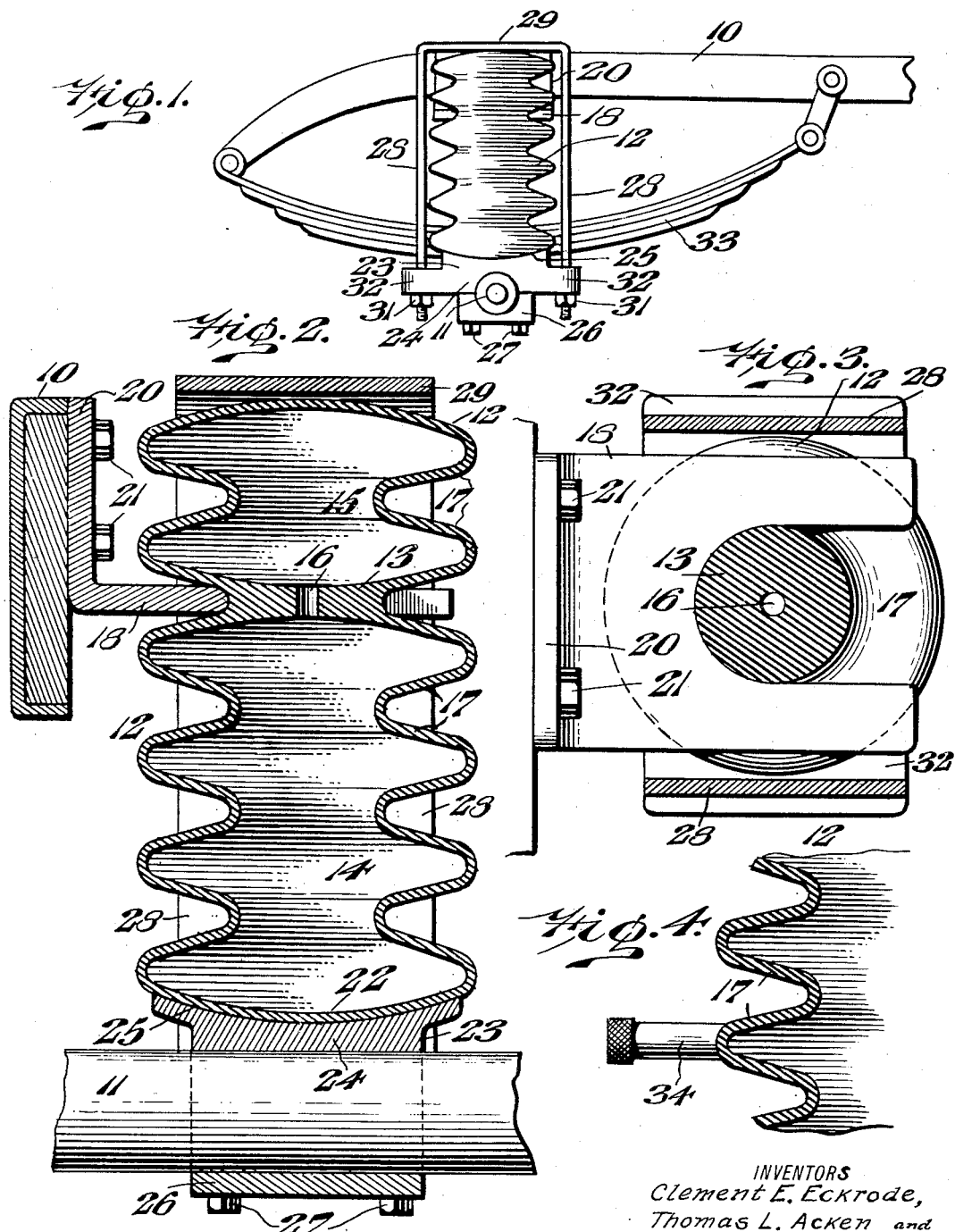
INVENTORS
Clement E. Eckrode,
Thomas L. Acken and
Alfred Weiland.
by Robert M. Barr.
ATTORNEY Patented July 15, 1924.

1,501,844

UNITED STATES PATENT OFFICE.

CLEMENT E. ECKRODE, OF NEW BRUNSWICK, THOMAS L. ACKEN, OF NEWARK, AND ALFRED WEILAND, OF EAST ORANGE, NEW JERSEY, ASSIGNORS TO PNEUMATIC APPLIANCES CORPORATION, OF NEW BRUNSWICK, NEW JERSEY, A CORPORATION OF NEW JERSEY.

SHOCK ABSORBER.

Application filed November 29, 1922. Serial No. 603,941.

*To all whom it may concern:*

Be it known that we, CLEMENT E. ECKRODE, THOMAS L. ACKEN, and ALFRED WEILAND, citizens of the United States, and residents, respectively, of Highland Park, New Brunswick, county of Middlesex, State of New Jersey, Newark, county of Essex, State of New Jersey, and East Orange, county of Essex, State of New Jersey, have jointly invented certain new and useful Improvements in Shock Absorbers, of which the following is a specification.

Some of the objects of the present invention are to provide an improved means for absorbing and eliminating shocks transmitted to a fixed part by the impact of a moving part; to provide a device for automobiles or other vehicles to absorb shocks and serving also as a snubber to neutralize the rebound from such shocks; to provide a compressed air shock absorber; to provide means for normally acting to support the load of a vehicle and substantially relieving the ordinary springs of such load; to provide an expansible double chambered casing containing a medium under pressure arranged under shock or rebound to pass with a retarded action from one chamber of said casing to the other chamber thereof; and to provide other improvements as will hereinafter appear.

In the accompanying drawings, Fig. 1 represents a side elevation of one form of shock absorber embodying the present invention, the form of vehicle spring shown therewith being merely by way of example; Fig. 2 represents a sectional elevation of the shock absorber shown in Fig. 1; Fig. 3 represents a section on line 3—3 of Fig. 2; and Fig. 4 represents a detail of a modified form of the invention.

Referring to the drawings, one form of the present invention is shown applied to an automobile, being interposed between the frame 10 and the axle 11, to absorb and neutralize shock and rebound transmitted from the axle. It is to be understood, however, that the invention is not to be limited to the use here shown because it is equally well adapted for use to relieve and absorb shock between any moving part and a fixed part. Also it will be understood that one or more of the devices of the present invention are employed to suit conditions.

In the present form of the invention, the shock and rebound absorbing means comprises a casing 12 of rubber, or any other suitable material having expansible properties, formed as a continuous, unitary element which is internally subdivided by a transverse partition 13 to provide two superposed chambers 14 and 15. This partition 13 is provided with a through opening or port 16 to establish communication between the aforesaid chambers in a restricted manner. In the preferred form of the invention the casing 12 is filled, during manufacture, with air placed under compression, the degree of which is sufficient to resist and sustain the proportionate normal load carried by the individual shock absorber.

In order to increase the volume of both of the chambers 14 and 15, so that either can discharge a portion of its elastic content into the other according to the direction of the applied force, the casing 12 has its side bounding wall corrugated as shown at 17.

For the purpose of mounting the casing 12 or shock absorbing element in its operative position interposed between the frame 10 and the axle 11, a bifurcated yoke 18 is provided to straddle a reduced section of the casing 12 formed by the corrugated structure, such reduced section, in the present instance, being taken in the plane of the partition 13. The other end of the yoke 18 forms an angle bracket 20, which is arranged to be rigidly made fast by bolts 21, or other fastening devices, to the frame 10. The depending portion of the casing 12 forming the chamber 14 preferably has a relatively wide, outwardly curved base 22 which is arranged to be seated in and secured to a journal box 23, through which the axle 11 passes for free rotary movement. The box 23 is here shown as having a part 24 provided with a seat 25 conforming to the shape of the base 22, while its other part 26 is made fast by bolts 27 or the like.

In order to cause the chamber 15 to be compressed so that it functions as a shock absorber under rebound action, a substantially U-shaped strap 28 is provided and seats over the casing 12 with its bridge-piece 29 above the end of the casing, while the leg parts 30 are made fast by bolts 31 to suitable lugs 32 or the like formed upon the box 23. Thus movement of the strap 28 with the journal 23 under rebound from the initial impact will cause the walls of the chamber 15 to be compressed between the strap 28 and the fixed yoke 18, and the compressed medium is expelled into the chamber 14.

The usual leaf spring construction 33 functions in its normal manner by connection between the frame 10 and the axle 11, though in the use of the present invention this spring or spring construction is normally relieved of the load by the action of the compressed air-filled casings 12, which are subject to pressure sufficient to hold the load independent of the springs. The casings 12 are thus pneumatically distended for that purpose, and are normally so maintained.

In Fig. 4 a modification of the invention is shown wherein the shock absorbing means is arranged to be inflated to the desired state of compression by providing an air valve 34 of any well known type arranged to have communication with the interior of a casing 35, which is otherwise similar to the casing 12 above described.

In the operation of the device, the frame 10 of the vehicle is supported substantially entirely by the compressed air shock absorbers 12, while side sway or movement laterally of the frame 10 is prevented by the ordinary spring support, so that under normal running conditions the load is carried more or less in a floating manner by the compressed air-inflated casing 12. This results in a complete elimination of minor jolts or shocks caused by small obstructions and inequalities of the roadway, and provides an ease and comfort of riding quality not attained by the ordinary spring action, or other types of shock absorbers employed in conjunction with such springs.

When the vehicle or other moving part strikes an obstruction, or a rut, or other inequality of the roadway of a nature to cause an appreciable shock to be transmitted to the frame of the vehicle, the device or devices of the present invention function to damp the impact and to so diminish its effect as to make it relatively unnoticeable in so far as the comfort of the occupants of the vehicle are concerned. This occurs because the force of the impact is applied to the axle and there transmitted directly to the pneumatic casing 12 and in consequence that portion of the casing 12 between the axle 11 and the fixed yoke 18 is compressed and a portion of its contents are forced through the port or passage 16 into the chamber 15, the action being so retarded by the proportioned dimension of the port 16 to the chambers as to absorb the shock transmitted from the axle. That portion of the casing 12 forming the chamber 14 is thus compressed while that portion of the casing forming the chamber 15 is considerably distended or expanded, the result being to lower the load to ride both upon the compressed air absorbers and upon the ordinary springs of the vehicle. As soon as the impact or shock is over, the normal rebound of the springs takes place, but instead of the usual sudden action it becomes a gradual uniform movement because the chamber 15 is now under compression between the strap bridgepiece 29 and the yoke 18 and is discharging its excess air by way of the port 16 back into the chamber 14 from which it was originally expelled by the impact action. Hence the shock absorber functions both to neutralize the impact of an applied force and the rebound following such impact, with the result that the frame 10 has a minimum movement under all shock conditions.

While but two forms are shown in which the invention may be embodied, it is to be understood that the invention is not limited to any specific construction but might be applied in various forms without departing from the spirit of the invention or the scope of the appended claims.

Having now fully described our invention, we claim:—

1. A shock absorber comprising an upper chamber and a lower chamber, a partition separating said chambers, said partition having a relatively small opening therethrough, and said chambers having a sealed wall of flexible material, and air under a predetermined compression contained within said chambers.

2. A shock absorber for a vehicle comprising a tubular corrugated casing filled with compressed air, means to support one end of said casing upon an axle of the vehicle, means attached to said casing between the ends thereof for securing said casing to the frame of said vehicle, and a partition arranged transversely of said casing and having a restricted passage therethrough.

3. A shock absorber for a vehicle comprising a tubular expansible casing containing a medium under compression, means to support one end of said casing upon an axle of the vehicle, means attached to said casing between the ends thereof for securing said casing to the frame of said vehicle, and a partition arranged substantially in alinement with said second means and transversely of said casing, said partition having a restricted passage therethrough forming a communication between opposite ends of said casing.

4. A shock absorber comprising a tubular expansible casing, a partition dividing said casing into two chambers, said partition having an opening therethrough to form a communication between said chambers, and means to support said casing between the frame of a vehicle and the axle thereof, whereby one of said chambers is arranged to be compressed by an impact upon said axle and the other of said chambers is arranged to be compressed under the rebound from said impact.

5. A shock absorber comprising a tubular expansible casing, a partition dividing said casing into two chambers, said partition having an opening therethrough to form a communication between said chambers, and means to support said casing between two relatively movable parts, whereby an impact on one part causes one of said chambers to be compressed and the rebound from said impact causes the other of said chambers to be compressed.

Signed at Newark, in the county of Essex, State of New Jersey, this 4th day of November, 1922.

CLEMENT E. ECKRODE.
THOMAS L. ACKEN.
ALFRED WEILAND.